(12) United States Patent
Lee et al.

(10) Patent No.: US 10,041,156 B2
(45) Date of Patent: Aug. 7, 2018

(54) HIGH STRENGTH AUSTENITIC-BASED STEEL WITH REMARKABLE TOUGHNESS OF WELDING HEAT-AFFECTED ZONE AND PREPARATION METHOD THEREFOR

(71) Applicant: POSCO, Pohang-si, Gyeongsangbuk-do (KR)

(72) Inventors: Hak-Cheol Lee, Pohang-si (KR); In-Shik Suh, Pohang-si (KR); Soon-Gi Lee, Pohang-si (KR); In-Gyu Park, Pohang-si (KR); Yong-Jin Kim, Pohang-si (KR); Hong-Ju Lee, Pohang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 114 days.

(21) Appl. No.: 14/758,203

(22) PCT Filed: Dec. 24, 2013

(86) PCT No.: PCT/KR2013/012083
§ 371 (c)(1),
(2) Date: Jun. 26, 2015

(87) PCT Pub. No.: WO2014/104706
PCT Pub. Date: Jul. 3, 2014

(65) Prior Publication Data
US 2015/0354037 A1    Dec. 10, 2015

(30) Foreign Application Priority Data

Dec. 26, 2012 (KR) .................. 10-2012-0153919
Dec. 26, 2012 (KR) .................. 10-2012-0153920

(51) Int. Cl.
*C21D 6/00*  (2006.01)
*C21D 8/00*  (2006.01)
(Continued)

(52) U.S. Cl.
CPC ............ *C22C 38/001* (2013.01); *C21D 6/002* (2013.01); *C21D 6/005* (2013.01); *C21D 8/005* (2013.01);
(Continued)

(58) Field of Classification Search
CPC ....... C22C 38/04; C22C 38/001; C22C 38/22; C22C 38/32; C21D 6/002; C21D 6/005; C21D 8/0226; C21D 8/0426
See application file for complete search history.

(56) References Cited

U.S. PATENT DOCUMENTS 4,104,504 A   8/1978  Ridenour et al.
4,130,418 A   12/1978 Hartvig
(Continued)

FOREIGN PATENT DOCUMENTS

CA    02785318 A1   7/2011
CN    1846002 A     10/2006
(Continued)

OTHER PUBLICATIONS

Balichev, E. Patent family including WO 2012095232 A1 published Jul. 19, 2012.*
(Continued)

*Primary Examiner* — George Wyszomierski
*Assistant Examiner* — Tima M McGuthry Banks
(74) *Attorney, Agent, or Firm* — McDermott Will & Emery LLP

(57) ABSTRACT

The present invention relates to a high strength austenitic-based steel with remarkable toughness of a welding heat-affected zone and a preparation method therefor. One embodiment of the present invention provides: a high strength austenitic-based steel with remarkable toughness of a welding heat-affected zone, comprising 0.8-1.5 wt % of C, 15-22 wt % of Mn, 5 wt % or less of Cr (except 0), and the
(Continued)

balance of Fe and other inevitable impurities, and further comprising at least one of the following (a) and (b), wherein the microstructure of a welding heat-affected zone comprises 90% or more of austenite by volume fraction; and a preparation method therefor. (a) Mo: 0.1-1% and B: 0.001-0.02% (b) Ti: 0.01-0.3% and N: 0.003-0.1%.

6 Claims, 2 Drawing Sheets

(51) Int. Cl.

| | | |
|---|---|---|
| C22C 38/04 | (2006.01) | |
| C22C 38/22 | (2006.01) | |
| C22C 38/32 | (2006.01) | |
| C22C 38/00 | (2006.01) | |
| C22C 38/20 | (2006.01) | |
| C21D 8/02 | (2006.01) | |
| C21D 8/04 | (2006.01) | |
| C22C 38/38 | (2006.01) | |
| C22C 38/28 | (2006.01) | |

(52) U.S. Cl.
CPC ......... *C21D 8/0226* (2013.01); *C21D 8/0426* (2013.01); *C22C 38/00* (2013.01); *C22C 38/04* (2013.01); *C22C 38/20* (2013.01); *C22C 38/22* (2013.01); *C22C 38/28* (2013.01); *C22C 38/32* (2013.01); *C22C 38/38* (2013.01)

(56) References Cited

U.S. PATENT DOCUMENTS

| | | | | |
|---|---|---|---|---|
| 5,431,753 | A * | 7/1995 | Kim | C21D 8/0205 148/620 |
| 7,794,552 | B2 * | 9/2010 | Cugy | C21D 8/0205 148/337 |
| 9,580,786 | B2 * | 2/2017 | Sohn | C23C 2/06 |
| 2008/0035248 | A1 | 2/2008 | Cugy et al. | |
| 2008/0035249 | A1 | 2/2008 | Scott et al. | |
| 2008/0053580 | A1 | 3/2008 | Drillet et al. | |
| 2009/0053556 | A1 | 2/2009 | Sohn et al. | |
| 2009/0074605 | A1 | 3/2009 | Kim et al. | |
| 2009/0202382 | A1 * | 8/2009 | Kim | C21D 6/004 420/74 |
| 2011/0308673 | A1 * | 12/2011 | Schneider | C21D 6/005 148/546 |
| 2013/0209831 | A1 * | 8/2013 | Becker | C21D 7/02 428/653 |
| 2013/0295409 | A1 | 11/2013 | Chin et al. | |
| 2014/0007992 | A1 * | 1/2014 | Balichev | B22D 11/0622 148/546 |
| 2015/0078955 | A1 | 3/2015 | Bouzekri et al. | |

FOREIGN PATENT DOCUMENTS

| | | | |
|---|---|---|---|
| CN | 101107377 | A | 1/2008 |
| CN | 101346489 | A | 1/2009 |
| CZ | 9301125 | A3 | 5/1995 |
| EP | 0 043 808 | A1 | 1/1982 |
| EP | 0 692 548 | A1 | 1/1996 |
| EP | 2 520 684 | A2 | 11/2012 |
| FR | 2 829 775 | A1 | 3/2003 |
| JP | S57-39158 | A | 3/1982 |
| JP | 62202023 | A * | 9/1987 |
| JP | S62-238353 | A | 10/1987 |
| JP | H01142058 | A | 6/1989 |
| JP | 09-202941 | A | 8/1997 |
| JP | 10-008210 | A | 1/1998 |
| JP | 2006-176843 | A | 7/2006 |
| JP | 2007-126715 | A | 5/2007 |
| JP | 2008-517158 | A | 5/2008 |
| KR | 10-2007-0067593 | A | 6/2007 |
| KR | 10-2007-0084352 | A | 8/2007 |
| KR | 10-2008-0060982 | A | 7/2008 |
| KR | 10-2011-0009792 | A | 1/2011 |
| WO | 92/04478 | A1 | 3/1992 |
| WO | 2011/081393 | A2 | 7/2011 |
| WO | 2012/081871 | A2 | 6/2012 |

OTHER PUBLICATIONS

Weman, Klas. Welding Processes Handbook. 2nd ed. Oxford: Woodhead, 2012. Google. Elsevier, 2012. pp. 198-200 and 202.*
Sharma, Romesh C. Principles of Heat Treatment of Steels. New Dehli: pp. 1 and 87 (Year: 1996).*
Ono, Tadashi. JP 62202023. Machine translation of the claim and description. (Year: 1987).*
Ju et al. "The Effect of Microstructural Change on Fracture Behavior in Heat-Affected Zone of API 5L X65 Pipeline Steel." 2000 International Pipeline Conference. ASME. vol. 1. IPC2000-122. pp. 169-175. (Year: 2000).*
Tadashi Ono et al. JP 62-202023 (published Sep. 5, 1987), Human translation.*
Partial Supplementary European Search Report issued in corresponding European Patent Application No. 13867247.2, dated Mar. 1, 2016.
First Office Action issued in corresponding Chinese Patent Application No. 201380068614.7, dated Mar. 21, 2016; with English translation.
Extended European Search Report issued in corresponding European Patent Application No. 13867247.2, dated Jul. 7, 2016.
Canadian Office Action issued in corresponding Canadian Patent Application No. 2,896,534, dated Oct. 7, 2016.
Notice of Office Action issued in corresponding Japanese Patent Application No. 2015-550309, dated Aug. 2, 2016; with Englis translation.
International Search Report issued in corresponding International Patent No. PCT/KR2013/012083, dated Mar. 3, 2014; 4 pages with English translation.

\* cited by examiner

[Figure 1]
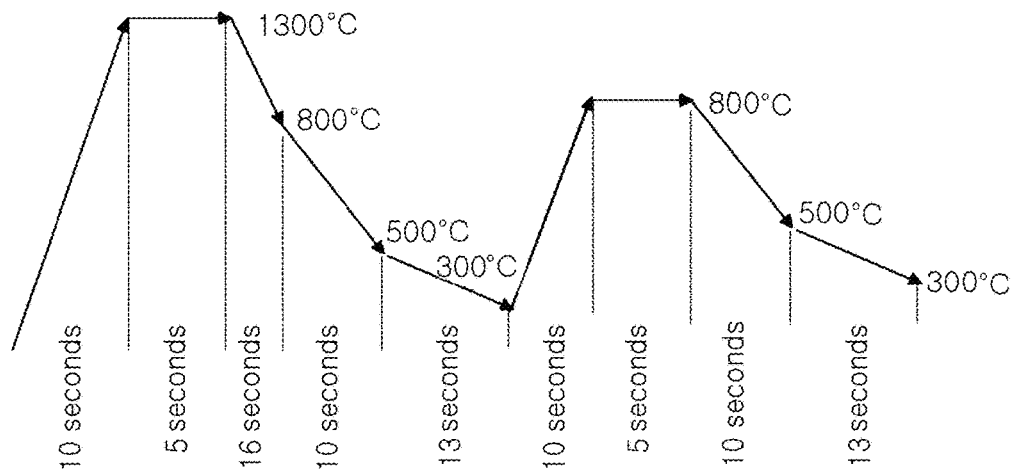
[Figure 2]
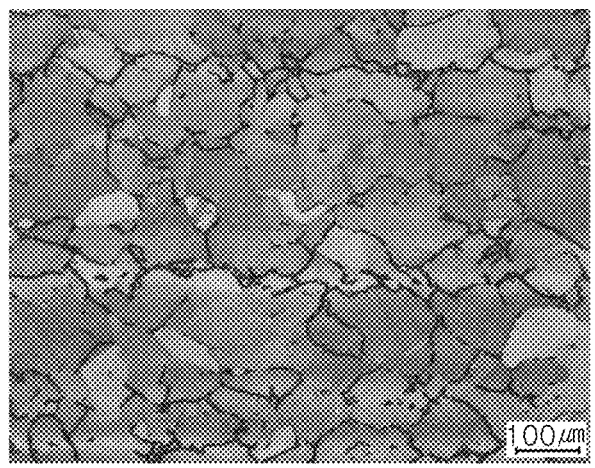

[Figure 3]
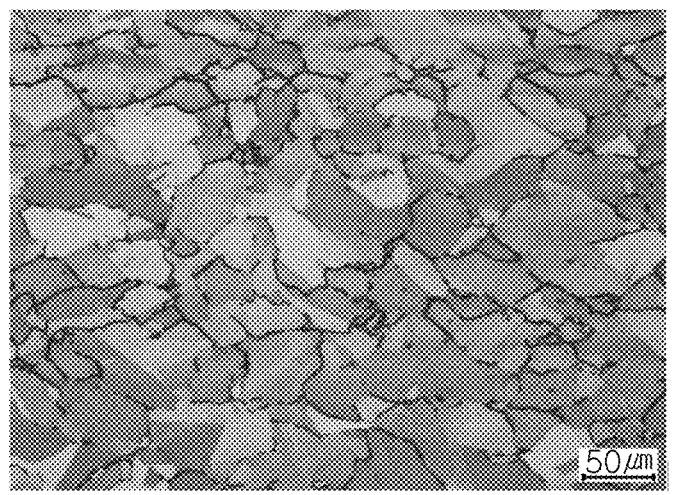

HIGH STRENGTH AUSTENITIC-BASED STEEL WITH REMARKABLE TOUGHNESS OF WELDING HEAT-AFFECTED ZONE AND PREPARATION METHOD THEREFOR

RELATED APPLICATIONS

This application is the U.S. National Phase under 35 U.S.C. § 371 of International Patent Application No. PCT/KR2013/012083, filed on Dec. 24, 2013, which in turn claims the benefit of Korean Patent Application No. 10-2012-0153919 filed on Dec. 26, 2012 and Korean Patent Application No. 10-2012-0153920 filed on Dec. 26, 2012, the disclosures of which Applications are incorporated by reference herein.

TECHNICAL FIELD

The present disclosure relates to high strength austenitic steel having remarkable toughness in a welding heat-affected zone and a preparation method therefor.

BACKGROUND ART

In general, austenitic steel has a variety of applications, due to the properties thereof, such as work hardenability and non-magnetism. Conventionally used carbon steel, having ferrite or martensite as a major structure thereof, has limitations in terms of the properties thereof, and thus, due to being a material able to overcome the disadvantages of carbon steel, the applications of austenitic steel are increasing.

Fields of application of austenitic steel, include non-magnetic structural materials for a general electrical devices and superconductive devices, such as linear induction motor rails and nuclear fusion reactors, and equipment for mining, transportation, and storage in the oil and gas exploration industries that require steel having ductility, wear resistance, and hydrogen embrittlement resistance of expandable pipe steel, slurry pipe steel, and sour gas resistant steel. In these fields, the demand for austenitic steel is continually increasing.

AISI304 (18Cr-8Ni) is a typical conventional austenitic stainless steel. However, this steel has low yield strength, and thus, is difficult to use as a structural material. In addition, since this steel includes Cr and Ni, relatively expensive alloying elements, in large quantities, it is economically unfeasible to use in large amounts, and thus, there are limits to the applications thereof.

The content of manganese and the content of carbon may be increased to form austenite microstructures in austenitic steel, and in particular, in addition to carbon, an amount of Cr may be significantly increased to maintain a high degree of strength in the austenitic steel. In this case, carbides having a network form may be formed along austenite grain boundaries of the austenitic steel at high temperature, and thus, the physical properties of steel, particularly ductility, may be significantly reduced. In addition, carbides may be heavily formed in a weld heat-affected zone, heated to a high temperature during welding and rapidly cooled thereafter, as in the case of a base metal, thereby significantly decreasing toughness in such a weld heat-affected zone.

In order to suppress the precipitation of carbides having a network form, a method for preparing high manganese steel featuring a solid solution treatment at a high temperature or performing hot working and quenching to room temperature has been suggested. However, in the case in which steel is relatively thick, there are disadvantages in that the effect on suppressing the generation of carbides by quenching may be insufficient, and also, it may be difficult to prevent the precipitation of carbides in a welding heat-affected zone affected by a new heat history.

DISCLOSURE

Technical Problem

An embodiment of the present disclosure is directed to high strength austenitic steel having improved corrosion resistance and to prevent decreasing in toughness in a welding heat-affected zone, and a method of preparing the same.

Technical Solution

An aspect of the present disclosure is to provide high strength austenitic steel having remarkable toughness in a welding heat-affected zone, including 0.8-1.5 wt % of C, 15-22 wt % of Mn, 5 wt % or less of Cr (except 0), and the balance of Fe and other inevitable impurities, and further including at least one of (a) and (b), in which the microstructure of a welding heat-affected zone comprises 90% or more of austenite by volume fraction:

(a) Mo: 0.1-1 wt % and B: 0.001-0.02 wt %
(b) Ti: 0.01-0.3 wt % and N: 0.003-0.1 wt %.

Another aspect of the present disclosure is to provide a method of preparing high strength austenitic steel having remarkable toughness in a welding heat-affected zone, in which the method includes re-heating a steel slab, including 0.8-1.5 wt % of C, 15-22 wt % of Mn, 5 wt % or less of Cr (except 0), and the balance of Fe and other inevitable impurities, and further including at least one of (a) and (b), at 1050° C. to 1120° C.; subjecting the re-heated steel slab to a hot finish rolling at 950° C. or higher to obtain a hot rolling steel; and cooling the hot rolling steel at the rate of 10° C./s or more to be 500° C. or less:

(a) Mo: 0.1-1 wt % and B: 0.001-0.02 wt %
(b) Ti: 0.01-0.3 wt % and N: 0.003-0.1 wt %.

Advantageous Effects

According to the present invention, it is possible to provide high strength austenitic steel having remarkable toughness in a welding heat-affected zone, in which the formation of carbides having a network form is suppressed, by controlling the alloying elements and composition range so as to control the grain size of austenite in a welding zone and improve the grain stability of the austenite, thereby controlling the precipitation of the carbides.

In addition, it is possible to use austenitic steel even in a corrosive environment for a long period of time by improving corrosion resistance through adding Cr.

BRIEF DESCRIPTION OF DRAWINGS

FIG. 1 illustrates a thermal cycle of HAZ in the case of welding steel using a flux-cored arc welding (FCAW).

FIG. 2 is a photograph illustrating the welding heat-affected zone of Experimental Example 2 according to an embodiment of the present invention, which is observed using an optical microscope.

FIG. 3 is a photograph illustrating the welding heat-affected zone of Experimental Example 6 according to an embodiment of the present invention, which is observed using an optical microscope.

BEST MODE

The inventors of the present invention confirmed that the components of steel should be properly controlled so as not to cause a problem, the decrease in the toughness of a welding zone by carbides having a network form, even though manganese, carbon, and chromium are included in large quantities to control the structure of steel to be austenite. As a result, the present inventors completed the present invention.

In other words, according to the present invention, manganese, carbon, and chromium are added in order to secure austenite structures. At this time, in order to minimize the formation of carbides due to carbon in the case where a thermal cycle, such as a welding, is affected, it is confirmed that the toughness of a welding zone including a welding heat-affected zone may be sufficiently secured by controlling the content of carbon according to the content of manganese. In addition, the formation of the carbides may be actively suppressed by controlling the grain size of austenite of the welding zone or improving the grain stability of austenite by further adding an element, and thus, the toughness of the base metal and welding zone may be sufficiently secured. Based on this knowledge, the present invention was completed.

Hereinafter, the present invention will be described. Firstly, the alloy composition of the steel according to the present invention will be described. Unless otherwise specifically noted, percentages used herein refer to weight percent (wt %).

Carbon (C): 0.8 to 1.5%

Carbon is an element that stabilizes austenite, and thus, is allowed to obtain austenite structures at room temperature. Carbon is an important element that is allowed to increase the yield strength of steel, and in particular, is soluble inside the austenite to increase work hardening, thereby securing high tensile strength or to secure the non-magnetic properties generated by the austenite. It is preferable that the content of carbon is 0.8% or more to secure these effects. When the content of carbon is less than 0.8%, the stability of austenite is decreased, and it is difficult to obtain high strength due to the lack of solute carbon. On the contrary, when the content of carbon is too high, there are disadvantages in that it is especially difficult to suppress the formation of carbides at a welding heat-affected zone, and the productivity is decreased due to a low melting point. Therefore, it is preferable to control the content of carbon to be 1.5% or less. As such, in the present invention, it is preferable that the content of carbon is within a range of 0.8 to 1.5%, and it is preferable that the content of carbon is within the range of 1.0 to 1.5% to obtain high strength.

Manganese (Mn): 15 to 22%

Manganese is the most important element for an austenite stabilizer element, and is used for high manganese steel as the present invention. One object of the present invention is to obtain austenite as a major structure, and thus, it is preferable that the content of manganese is 15% or more. When the content of manganese is less than 15%, the stability of austenite is decreased, and thus, it is difficult to secure sufficient low temperature toughness. Meanwhile, when the content of manganese exceeds 22%, there are disadvantages in that corrosion resistance is decreased, a preparation process is difficult, and manufacturing costs is increased due to the addition of manganese, and also, the work hardening is decreased to decrease the tensile strength.

Chromium (Cr): 5% or less (except 0%)

Chromium is an element that effectively improves corrosion resistance and strength. In the present invention, the manganese in the above-described range is included to stabilize austenite, and generally, the manganese is allowed to decrease the corrosion resistance of steel, and in particular, in the content of manganese in the above-described range, the corrosion resistance is low, compared to general carbon steel. In order to solve these problems, in the present invention, both the corrosion resistance and strength are improved by adding 5% or less chromium. However, when the content of chromium exceeds 5 wt %, manufacturing costs is increased; carbides are also formed in accordance with the grain boundary along with the solute carbon in the material, thereby decreasing ductility, in particular, emulsion strain induced crack resistance; and ferrite is formed, and thus, it is difficult to secure austenite as a major structure. Therefore, it is preferable to control the content of chromium at 5 wt % or less. Specifically, it is more preferable to add 2 wt % or more of the chromium in order to maximize the effect on improving corrosion resistance. As described above, it may be widely applied in fields requiring corrosion resistance by improving corrosion resistance through adding chromium.

Mo: 0.1 to 1% and B: 0.001 to 0.02%

Molybdenum and boron are elements that are segregated into austenite grains, and increase stability of the grain. Generally, they control the phenomenon of precipitating the carbides in large quantities in the austenite grains due to low grain stability. When the content of molybdenum is less than 0.1%, the grain stability is not sufficiently increased, and thereby, the precipitation of carbide is not largely controlled. When the content of molybdenum exceeds 1%, manufacturing costs may be increased and the toughness may be decreased by giving the steel high strength. Therefore, the content of molybdenum is preferably in the range of 0.1 to 1%. In addition, when the content of boron is less than 0.001%, the grain stability is not sufficiently increased, and thus, the precipitation of carbides is not largely controlled. When the content of boron exceeds 0.02%, the toughness may be decreased by giving the steel high strength, and brittleness may be generated by BN precipitation. Therefore, the content of boron is preferably in the range of 0.01 to 0.02%.

Titanium (Ti): 0.01 to 0.3% and nitrogen (N): 0.003 to 0.1%

Titanium and nitrogen are elements that form TiN at a high temperature and prevent the movement of grain when growing an austenite crystal structure. In general, when the ratio of Ti:N is less than 3:1, TiN is crystallized in large crystals, thereby having a negative influence on crystal grain refinement. Therefore, it is preferable that the ratio of Ti:N is more than 3:1 by increasing the amount of N. When the amount of Ti is less than 0.01%, the amount of TiN is decreased, and thus, the grain growth is not greatly inhibited. Therefore, it is preferable to add Ti in the amount of 0.01% or more. When Ti exceeds 0.3%, oxide is formed at the time of manufacturing steel, and thus, the productivity is decreased. Therefore, the content thereof is preferably controlled to be 0.3% or less. In addition, when N is added in an amount of less than 0.003%, the amount of TiN is decreased, and thus, the grain growth is not largely inhibited. Therefore, it is preferable to add Ti in the amount of 0.003% or more. When it is added in an amount higher than 0.1%, strength is increased, while the ductility of the base metal is decreased. Therefore, it is preferable to add Ti in the amount of 0.1% or less.

The balance component in the steel of the present invention is Fe, and the steel of the present invention may include impurities that are inevitably included at the time of preparation. Meanwhile, the steel of the present invention has the alloy composition as described above, and thus, may have excellent strength and low temperature toughness. However, in order to further improve the above-described effect by further suppressing the formation of carbide, Fe in the amount of 2% or more may be further included.

Copper (Cu): 2% or less

Copper has very low solid solubility in carbide and is slowly diffused in austenite, and thus, has an effect on suppressing carbide. However, when it exceeds 2%, manufacturing costs may be increased, and furthermore, Cu may cause hot shortness that generates cracks in a steel plate at the time of preparation. Therefore, it is preferable that the amount thereof is controlled to be 2% or less.

The steel of the present invention has an austenite microstructure, and furthermore, the welding heat-affected zone has 90% or more austenite by volume fraction. When the welding heat-affected zone has less than 90 vol % of the austenite fraction, wear resistance and impact toughness may be reduced. Meanwhile, the austenite fraction means that the carbide is included as one type of microstructure. In other words, when the carbide is not included in the content range of the microstructure, the steel of the present invention has an austenite single-phase structure. Meanwhile, the steel of the present invention does not mean only the material itself, and includes even the steel in a welded state that is applied in the final product.

In addition, the steel of the present invention has preferably 100 μm or less of the grain size of the austenite (except 0). Sites in which the carbide may be precipitated are provided in large quantities by decreasing the grain size of the austenite, and thereby, the carbide may not be formed to be arborescent but formed as a diffused sphere. As a result, the toughness may be improved. As the austenite crystal grain is microscopic in size, it is favorable to secure the effect of the present invention, and thus, the lower limit thereof is not particularly limited.

In addition, for the steel provided by the present invention, it is preferable to control the carbide formed at the welding heat-affected zone to be 10 vol % or less. When the fraction of the carbide exceeds 10 vol %, there may be a problem in that the toughness of the welding heat-affected zone may be reduced due to the carbide.

The steel of the present invention that is provided as described above has 50 J or more of a Charpy impact value of a welding heat-affected zone at −40° C., and 450 MPa of a yield strength, which means excellent toughness of a welding heat-affected zone and high strength.

Hereinafter, an embodiment of the method of preparing the austenite steel of the present invention will be described.

Firstly, the steel slab having the alloy composition as described above is re-heated at 1050 to 1120° C. When the re-heating temperature exceeds 1120° C., the steel may be partially melted, and when the re-heating temperature is less than 1050° C., the carbide may not be melted, and thus, impact toughness may be decreased.

The steel slab that is re-heated as described above is subjected to a hot finish rolling at 950° C. or higher to obtain a hot rolling steel. When the temperature of the hot finished rolling is less than 950° C., recrystallization may be partially generated, and thus, a non-uniform crystal grain may be formed. Meanwhile, even though the steel of the present invention is subjected to the hot finished rolling in the range of the re-heating temperature as an austenitic steel, the structure and the physical properties to be desired may be secured without any problems. Therefore, the maximum of the hot finished rolling temperature is not particularly limited, and eventually, hot finish rolling may be performed in the range of 950 to 1120° C.

Subsequently, the hot rolling steel is cooled to 500° C. or less at the rate of 10° C./s. When the rate of cooling is less than 10° C./s or exceeds 500° C., the impact toughness may be decreased due to the precipitation of carbide. As long as the rate of cooling is 10° C./s, the structure and physical properties to be described for the present invention may be secured without any problems. Therefore, the maximum thereof is not particularly limited, but due to facilities' limitations, it is difficult to exceed 100° C./s. When the stopping of cooling is performed at 500° C. or less, the structure and physical properties to be described for the present invention may be easily secured, and thus, the minimum thereof is not particularly limited. For example, the cooling may be performed to room temperature.

Hereinafter, the present invention will be described with reference to Examples. However, the following Examples are not only for illustrating the present invention, and are not limited to the correct range of the present invention.

Example 1

The steel slab having the chemical compositions listed in the following Table 1 was re-heated at 1120° C., and then was subjected to a rough rolling at 1100° C. Afterwards, the steel slab thus obtained was subjected to a finish rolling at 950° C., and then was cooled to room temperature at the rate of 20° C./s to manufacture hot rolling steel. The welding of the hot rolling steel thus manufactured was performed under the conditions illustrated in FIG. 1. FIG. 1 illustrates a thermal cycle of HAZ in the case of welding steel having a thickness of 40 mm with heat input capacity of 20 KJ/cm using flux-cored arc welding (FCAW). For the welding heat-affected zone (HAZ) that was obtained as described above, the microstructure and mechanical physical properties were measured, and the results thereof are listed in Table 2.

TABLE 1

| Items | Chemical Composition (wt %) | | | | | |
| --- | --- | --- | --- | --- | --- | --- |
| | C | Mn | Cr | Mo | B | Cu |
| Experimental Example 1 | 1.21 | 19.1 | 3.2 | 0.3 | 0.005 | — |
| Experimental Example 2 | 1.41 | 21.4 | 4.2 | 0.8 | 0.012 | 1.0 |
| Experimental Example 3 | 1.07 | 16.9 | 2.1 | 0.5 | 0.008 | — |
| Experimental Example 4 | 1.18 | 17.2 | 1.7 | 0.9 | 0.016 | — |
| Experimental Example 5 | 1.34 | 20.6 | 3.8 | 0.7 | 0.007 | — |
| Comparative Example 1 | 1.28 | 19.2 | 2.4 | 0.02 | 0.008 | — |
| Comparative Example 2 | 1.12 | 17.8 | 3.1 | 0.4 | 0.0002 | — |

TABLE 2

| Items | Base Metal Yield Strength (MPa) | Base Metal Tensile Strength (MPa) | HAZ Austenite Fraction (vol %) | HAZ Carbide Fraction (vol %) | HAZ Impact Toughness (J, @-40° C.) |
|---|---|---|---|---|---|
| Experimental Example 1 | 531 | 1084 | 94.2 | 5.8 | 143 |
| Experimental Example 2 | 580 | 1101 | 92.1 | 7.9 | 115 |
| Experimental Example 3 | 485 | 997 | 98 | 2 | 168 |
| Experimental Example 4 | 512 | 1035 | 97.3 | 2.7 | 171 |
| Experimental Example 5 | 568 | 1094 | 93.5 | 6.5 | 104 |
| Comparative Example 1 | 521 | 1021 | 82.7 | 17.3 | 12 |
| Comparative Example 2 | 503 | 1002 | 85.2 | 14.8 | 25 |

As listed in the above Tables 1 and 2, it could be confirmed that in the cases of Experimental Examples 1 to 5 that satisfied the alloy composition suggested by the present invention, excellent impact toughness, 100 J or more at −40° C., was secured by securing 90% or more of the austenite fraction of the welding heat-affected zone.

FIG. 2 is a photograph illustrating the welding heat-affected zone of Experimental Example 2 according to an embodiment of the present invention, which is observed using an optical microscope. As illustrated in FIG. 2, it could be confirmed that the welding heat-affected zone of Experimental Example 2 included 90% or more of austenite.

However, it could be confirmed that in the cases of Comparative Examples 1 and 2 that did not satisfy the alloy composition suggested by the present invention, 10% or more of the carbide in the crystal grain system was precipitated, and thus, the proper amount of austenite fraction was not secured, thereby reducing the impact toughness to less than 50 J.

Example 2

The steel slab having the chemical compositions listed in Table 3 was re-heated at 1120° C., and then was subjected to a rough rolling at 1100° C. Afterwards, the steel slab thus obtained was subjected to finishing rolling at 950° C., and then was cooled to room temperature at a rate of 20° C./s to manufacture a hot rolling steel. The welding of the hot rolling steel thus manufactured was performed under the conditions illustrated in FIG. 1. For the welding heat-affected zone (HAZ) that was obtained as described above, the microstructure, the size of crystal grain, and mechanical physical properties were measured, and the results thereof are listed in Table 4.

TABLE 3

| Items | Chemical Composition (wt %) | | | | | |
|---|---|---|---|---|---|---|
| | C | Mn | Cr | Ti | N | Cu |
| Experimental Example 6 | 0.87 | 19.3 | 2.3 | 0.05 | 0.009 | — |
| Experimental Example 7 | 1.23 | 20.5 | 3.5 | 0.12 | 0.03 | — |
| Experimental Example 8 | 1.35 | 18.7 | 1.6 | 0.21 | 0.06 | 0.5 |
| Experimental Example 9 | 0.99 | 17.6 | 4.2 | 0.18 | 0.04 | — |
| Experimental Example 10 | 1.12 | 21.1 | 3.1 | 0.09 | 0.02 | — |
| Comparative Example 3 | 1.33 | 20.3 | 1.8 | 0.002 | 0.06 | — |
| Comparative Example 4 | 1.02 | 18.2 | 3.6 | 0.23 | 0.001 | — |

TABLE 4

| Items | Base Metal Yield Strength (MPa) | Base Metal Tensile Strength (MPa) | HAZ Austenite Fraction (vol %) | Size of Austenite Crystal Grain (μm) | HAZ Carbide Fraction (vol %) | HAZ Impact Toughness (J, @-40° C.) |
|---|---|---|---|---|---|---|
| Experimental Example 6 | 458 | 923 | 97.1 | 82 | 2.9 | 133 |
| Experimental Example 7 | 533 | 1067 | 93.5 | 71 | 6.5 | 147 |
| Experimental Example 8 | 562 | 1103 | 95.5 | 62 | 4.5 | 165 |
| Experimental Example 9 | 488 | 1055 | 93.7 | 68 | 6.3 | 174 |
| Experimental Example 10 | 502 | 1044 | 96.7 | 82 | 3.3 | 121 |
| Comparative Example 3 | 544 | 1070 | 85.4 | 207 | 14.6 | 33 |
| Comparative Example 4 | 496 | 1008 | 83.1 | 175 | 16.9 | 42 |

As listed in the above Tables 3 and 4, it could be confirmed that in the cases of Experimental Examples 6 to 10 that satisfied the alloy composition suggested by the present invention, micro crystal grains of 100 μm or less were included by securing 90% or more of the austenite fraction of the welding heat-affected zone, thereby securing excellent impact toughness, 100 J or more at −40° C.

FIG. 3 is a photograph illustrating the welding heat-affected zone of Experimental Example 6 according to an embodiment of the present invention, which is observed using an optical microscope. As illustrated in FIG. 3, it could be confirmed that the welding heat-affected zone of Experimental Example 1 included 90% or more austenite.

However, it could be confirmed that in the cases of Comparative Examples 3 and 4 that did not satisfy the alloy composition suggested by the present invention, the austenite fraction suggested by the present invention was not secured, and the austenite crystal grains were grown in an amount higher than 100 μm so as to precipitate 10% or more of the carbide in the crystal grain system, thereby reducing the impact toughness to be less than 50 J.

The invention claimed is:
1. High strength austenitic steel, comprising 0.8-1.5 wt % of C, 15-22 wt % of Mn, 1.6-5 wt % of Cr, and the balance of Fe and other inevitable impurities, and further comprising at least one of (a) and (b),
wherein the high strength austenitic steel comprises a welding heat-affected zone,
wherein the microstructure of the welding heat-affected zone comprises 90% or more of austenite, and 10% or less of carbide by volume fraction, and does not comprise ferrite, and
wherein the welding heat-affected zone has 50 J or more of a Charpy impact value at −40° C.:

(a) Mo: 0.1-1 wt % and B: 0.001-0.02 wt %
(b) Ti: 0.01-0.3 wt % and N: 0.003-0.1 wt %.

2. The high strength austenitic steel of claim 1, wherein the steel further includes 2 wt % or less of Cu.

3. The high strength austenitic steel of claim 1, wherein the size of the austenite crystal grain is 100 μM or less.

4. The high strength austenitic steel of claim 1, wherein a sum of the austenite and the carbide is 100% by volume fraction.

5. The high strength austenitic steel of claim 1, wherein the steel has 450 MPa or more of yield strength.

6. A method of preparing high strength austenitic steel, the method comprising:

re-heating a steel slab, including 0.8-1.5 wt % of C, 15-22 wt % of Mn, 1.6-5 wt % of Cr, and the balance of Fe and other inevitable impurities, and further including at least one of (a) and (b), at 1050 to 1120° C.;

subjecting the re-heated steel slab to a hot finished rolling at 950° C. or higher to obtain a hot rolling steel;

cooling the hot rolling steel at the rate of 10° C./s or more to be 500° C. or less; and forming a heat-affected zone by welding the hot rolling steel, wherein the microstructure of the welding heat-affected zone comprises 90% or more of austenite, and 10% or less of carbide by volume fraction, and does not comprise ferrite, and wherein the welding heat-affected zone has 50 J or more of a Charpy impact value at −40° C.:

(a) Mo: 0.1-1 wt % and B: 0.001-0.02 wt %
(b) Ti: 0.01-0.3 wt % and N: 0.003-0.1 wt %.

* * * * *